Figures 1, 2:
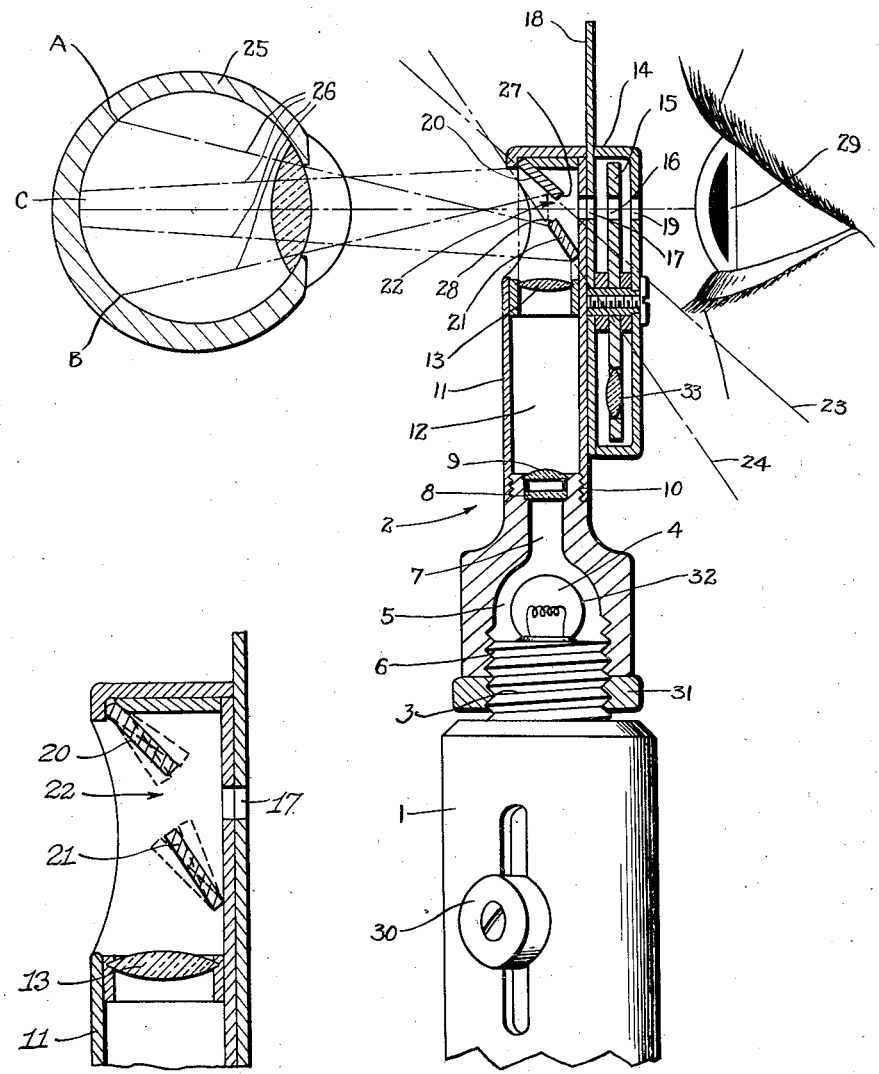

Sept. 17, 1935.   E. A. FORSHEY   2,014,888
DIAGNOSTIC INSTRUMENT
Filed Oct. 9, 1933

INVENTOR
ELMORE A. FORSHEY
BY
Harry H. Styll
ATTORNEY

Patented Sept. 17, 1935

2,014,888

UNITED STATES PATENT OFFICE 2,014,888

DIAGNOSTIC INSTRUMENT

Elmore A. Forshey, Southbridge, Mass., assignor to American Optical Company, Southbridge, Mass., a voluntary association of Massachusetts Application October 9, 1933, Serial No. 692,830

3 Claims. (Cl. 88—20)

This invention relates to improvements in diagnostic instruments and has particular reference to that type of instrument having self-contained illuminating means.

One of the principal objects of the invention is to provide a diagnostic instrument utilizing artificial illumination with improved means for projecting light rays on to the object to be examined.

Another important object of the invention is to provide light deflecting means in an instrument of the above character whereby a greater area of illumination of the interior of the eye may be obtained.

Another object is to provide means in an instrument of the above character whereby two reflected beams of light may be made to merge from opposite angles as they enter the eye and cross each other internally of the eye and provide means for illuminating a greater area of the interior of said eye.

Another object is to provide means in combination with reflective means of the above nature which will permit observation between the two beams and thus remove the corneal reflex from the observer's direct visual path.

Another object is to provide simple, efficient and economical means for increasing the field of illumination of instruments of the above character.

Other objects and advantages of the invention will become apparent from the following description taken in connection with the accompanying drawing, and it will be apparent that many changes may be made in the details of construction and arrangement of parts shown and described without departing from the spirit of the invention as expressed in the accompanying claims. I, therefore, do not wish to be limited to the exact details shown and described as the preferred form only has been shown by way of illustration.

Referring to the drawing:

Fig. I is a fragmentary side elevation of the instrument embodying the invention showing portions thereof in cross section and showing diagrammatically how the field of illumination is increased.

Fig. II is a diagrammatic view illustrating the various positions to which the light deflecting members may be separately adjusted relative to each other.

It has been usual, in the past, in instruments of this character to provide reflective or light deflective means which will produce only a single beam of light. In the use of an instrument of this character, particularly when examining the interior of an eye, it has only been possible, due to the pupil of the eye, to illuminate and therefore examine at one time, only restricted areas of the interior of the eye. To focus the light on other restricted areas the angle of the beam of light entering the eye had to be changed by tilting the instrument and refocusing the light.

It is apparent that with instruments of this character much time was required in examining the eye and much difficulty was encountered in obtaining sufficient illumination to enable the proper examination.

It, therefore, is one of the primary objects of this invention to provide means in an instrument of the above character whereby substantially the entire area of the interior of the eye which is to be examined may be illuminated at one focusing of the instrument, and which will not require refocusing of the light at different angles as has been usual in the past.

Referring more particularly to the drawing wherein like characters of reference designate like parts throughout the several views, the instrument embodying the invention comprises a handle having a head supporting neck 1 for supporting the head 2. The neck 1 is provided with a reduced threaded portion 3 which provides attaching means for the head 2 and forms a socket for the illuminating means 4. The head 2 is provided with an enlarged end having a lamp chamber 5 therein and having an internal threaded portion 6 adapted to be threadedly connected with the threaded portion 3. The portion having the chamber 5 therein has a light passage way 7 in which is mounted a light diffusing member 8 and a condensing lens 9.

The member having the chamber 5 therein is provided with a reduced threaded portion 10 having a detachable casing 11 threadedly attached thereto. The casing 11 is provided with a light passage way 12 in line with the light passage way 7 and has a condensing lens 13 adjacent its end opposite the end connected to the threaded portion 10. The upper end portion of the casing 11 carries a housing 14, within which is contained a rotatable disc 15 having ports 16 which can be turned into alignment with a port 17 in the main stationary housing support 18. The housing 14 is likewise provided with a port 19 in line with the ports 16 and 17.

Located above the condensing lens 13 and within the path of light coming from the light passage way 12 there is a pair of reflectors or light deflecting members 20 and 21 adapted to deflect the light rays at different angles relative to the optic axis of the lens 13. The reflectors or light deflecting members 20 and 21 are in spaced relation with each other to form a slot 22 in line with the ports 16, 17, and 19. This slot provides means whereby the operator may look through said reflectors or light deflecting members on a line substantially normal to the axis of the condensing lens 13. The light deflecting members 20 and 21, as illustrated by the dot and dash lines 23 and 24, are positioned so that the reflective surfaces thereof are angled relative to each other. This angle of the reflective surfaces being such as to reflect the light rays impinging thereon so that the said rays will cross each other as they enter the pupil of the eye 25 which is to be examined. It is to be understood that the angles of these reflective surfaces are such that the light rays will cross each other as they enter the eye when the instrument is held in its position of use relative to said eye. Due to the fact that the light rays cross each other, as illustrated by the dot and dash lines 26, a larger field of illumination internally of the eye may be obtained, the limits of said field being indicated at the points A and B. Attention is also directed to the fact that the angles of the reflectors or light deflecting members 20 and 21 are such that the two reflected beams will overlap each other slightly at the point C so as not to cause a break in the illuminated field.

Attention is also directed to the fact that the reflectors or light deflecting members are so positioned relative to each other that the rear edge 27 of the member 20 will lie behind the front edge 28 of the member 21 along the line of the axis of the lens 13. This is to provide means whereby there will be no break in the projected light and also to provide means whereby light rays traveling longitudinally of the light passage way 12 will not impinge upon the edge 27 and be reflected into the eye 29 of the examiner.

The neck 1 of the instrument is provided with a suitable rheostat 30 to provide means for varying the intensity of the light. This rheostat means is similar to that now in common use on instruments of this character.

On the reduced threaded portion 3 there is provided a lock nut member 31 which is adapted to provide means for locking the head 2 of the instrument in various adjusted positions on the neck 1. The object of the lock nut member 31 is to provide means whereby the head 2 may be adjusted on the neck 1 to position the filament 32 of the illuminating means at different angles relative to the light deflecting members 20 and 21. When the parts are in desired relation with each other the head 2 is fixed to the neck 1 by tightening the lock nut 31. This provides positive means for fixing the position of the angle of the filament relative to the light deflecting members.

The rotatable disc 15 is provided with suitable corrective lens members 33 which may be aligned with the ports 17 and 19 of the instrument to provide means for altering the vision of the observer's eye. This arrangement is similar to that of prior art instruments.

Although applicant has shown and described two separate reflectors or light deflecting members 20 and 21 and has shown said members as being in fixed angular relation with each other it is apparent that the reflectors or light deflecting members may be formed integral with each other and provided with a central aperture or slot 22 through which the examiner may look and that the said reflectors or light deflecting members may be made separate and mounted so that they may be adjusted one relative to the other as shown in Fig. II to vary the angle of one reflective face relative to the other. This provides means for varying the distance of the point of intersection of said rays relative to the deflecting members.

From the foregoing description it will be seen that applicant has provided simple, efficient and economical means of accomplishing all of the objects and advantages of the invention, particularly that of providing means whereby the illuminated area of the interior of the eye may be greatly increased.

Having described my invention, I claim:

1. In a diagnostic instrument having a sight opening and self contained illuminating means, means for increasing the area of illumination by said illuminating means internally of an eye comprising a plurality of light deflecting members in predetermined angular relation with each other as determined by the position of use of the instrument relative to the eye and in line with the path of the light rays coming from the self contained illuminating means to deflect said light rays substantially along the line of sight of the instrument when in its position of use and to cause the light rays deflected by said light deflecting members to cross each other at the entrance window of the eye and thereafter spread laterally internally of the eye to increase the field of illumination in said eye.

2. In a diagnostic instrument having a sight opening and self contained illuminating means, means for increasing the area of illumination by said illuminating means internally of an eye comprising a plurality of light deflecting members in predetermined angular relation with each other as determined by the position of use of the instrument relative to the eye and in line with the path of the light rays coming from the self contained illuminating means to deflect said light rays substantially along the line of sight of the instrument when in its position of use and to cause the light rays deflected by said light deflecting members to cross each other at the entrance window of the eye and thereafter spread laterally internally of the eye to increase the field of illumination in said eye, said angular relation of the light deflecting members being such that the inner or adjacent edges of the separate fields of illumination internally of the eye created by the separate deflectors will overlap each other slightly to provide a continuous unbroken field of illumination.

3. In a diagnostic instrument having a sight opening and self contained illuminating means, means for increasing the area of illumination by said illuminating means internally of an eye comprising a plurality of light deflecting members in predetermined angular relation with each other as determined by the position of use of the instrument relative to the eye and in line with the path of the light rays coming from the self contained illuminating means to deflect said light rays substantially along the line of sight of the instrument when in its position of use and to cause the light rays deflected by said light deflecting members to cross each other at the entrance window of the eye and thereafter spread laterally internally of the eye to increase the field of illumination in said eye, said light deflecting members being adjustably supported relative to each other to provide means for altering the angular relation thereof as desired.

ELMORE A. FORSHEY.